United States Patent [19]
Dempsey

[11] Patent Number: 5,206,644
[45] Date of Patent: Apr. 27, 1993

[54] SYSTEM AND METHOD FOR EXTENDING THE LIFE OF AIRCRAFT ANTI-COLLISION LIGHTS

[76] Inventor: Robert M. Dempsey, 4541 Wagon Wheel Rd., Carson City, Nev. 89703

[21] Appl. No.: 765,955

[22] Filed: Sep. 26, 1991

[51] Int. Cl.$^5$ .............................................. G08G 5/04
[52] U.S. Cl. ...................................... 340/961; 340/963; 340/970
[58] Field of Search ............... 340/963, 970, 945, 961, 340/981, 977, 982; 73/179; 362/62; 244/1 R, 180; 364/433

[56] References Cited

U.S. PATENT DOCUMENTS

| | | | |
|---|---|---|---|
| 3,858,172 | 12/1974 | Henry | 340/970 |
| 3,885,226 | 5/1975 | Lang et al. | 340/981 |
| 4,060,793 | 11/1977 | Bateman | 340/945 |
| 4,185,232 | 1/1980 | Ingalls et al. | 340/981 |

FOREIGN PATENT DOCUMENTS
1283824 1/1987 U.S.S.R. .............................. 340/945

Primary Examiner—Jin F. Ng
Assistant Examiner—Brent A. Swarthout
Attorney, Agent, or Firm—Thorpe, North & Western

[57] ABSTRACT

A system and method for extending the useful life of anti-collision lights comprising inert gas flash tubes and which are included on commercial, military, and business jet aircraft. When the aircraft is cruising in high altitude tightly controlled airspace (where instrument flight rules are controlling, i.e., at altitudes above 18,000 feet), and when the aircraft is not undergoing a substantial change in altitude, the power input to the anti-collision lights is reduced. The reduction in the power provides a significant increase in the useful life of the flash tube while causing only slight reduction in the intensity of the light output of the flash tube.

32 Claims, 6 Drawing Sheets

SYSTEM AND METHOD FOR EXTENDING THE LIFE OF AIRCRAFT ANTI-COLLISION LIGHTS

BACKGROUND

1. The Field of the Invention

This invention relates to devices used to improve the visibility of aircraft and avoid mid-air collisions. More particularly, the present invention relates to high intensity strobe lights used as anti-collision lights on commercial, business and military jet aircraft.

2. The Prior Art

Avoidance of collisions between aircraft is of paramount concern to those involved in the aircraft industry. While sophisticated collision avoidance systems involving radio, radar, and other sophisticated technologies are available and/or have been proposed, the primary collision avoidance system remains the vision of the pilots flying the aircraft. Pilots are taught to continually scan the observable airspace through the cockpit window. In order to improve the visibility of an aircraft, flashing anti-collision lights are included on the exterior of aircraft.

The intense, short, and attention grabbing burst of light provided by xenon gas strobe devices make such devices well suited for use as anti-collision lights. The strobe lights are configured to emit a bright flash of light at a regular interval, i.e., one second. Typical strobe lights operate by storing a large electrical charge and then discharging it through a quartz tube filled with xenon gas. The current, which can reach hundreds of amperes, ionizes the xenon gas, discharging photons and yielding a very bright flash of light.

While the xenon flash tube works well at producing a very bright and noticeable flash of light it has the disadvantage of having a relatively short operating life. The relatively short operating life of a typical xenon flash tube results from the high currents passed therethrough which cause erosion of the electrodes inside of the tube. The erosion of the electrodes requires that the flash tube eventually be replaced. The flash tubes, however, generally do not fail catastrophically, as do incandescent lamps. Rather, the light output from the flash tube slowly decreases with each firing as the metal which is eroded from the electrode is deposited on the inside of the tube. This process slowly reduces the light transmission through the tube and thus output from the flash tube decreases.

Replacing the flash tubes of anti-collision lights is a significant maintenance cost of operating an aircraft. A typical commercial airliner averages about 10.5 hours per day in flight. This amount of time in flight means that the output of a typical flash tube will be reduced to fifty percent after two to five months in use. Considering that each commercial aircraft can include anywhere from two to more than five flash tubes, and that there are over 4000 commercial airliners in the U.S. alone, and that the cost of maintenance for each flash tube equipped anti-collision light is expected to average about $1,000 per year, it will be appreciated that the cost of replacing and maintaining flash tubes in anti-collision lights is substantial. Thus, it would be a significant advance in the art to extend and improve the operating life of an aircraft anti-collision light.

BRIEF SUMMARY AND OBJECTS OF THE INVENTION

In view of the above described state of the art, the present invention seeks to realize the following objects and advantages.

It is a primary object of the present invention to provide a system and method for extending the useful life of aircraft anti-collision lights.

It is also an object of the present invention to provide a system and method for extending the useful life of aircraft anti-collision lights which does not impair the intended function of the anti-collision lights.

It is another object of the present invention to provide a system and method for extending the useful life of aircraft anti-collision lights which is reliable.

It is a further object of the present invention to provide a system and method for extending the useful life of aircraft anti-collision lights which can be effectively retrofitted to existing anti-collision lights.

It is a still further object of the present invention to provide a system and method for extending the useful life of aircraft anti-collision lights which is of low enough cost so that the cost of the system is earned back in saved maintenance costs in a relatively short time.

These and other objects and advantages of the invention will become more fully apparent from the description and claims which follow, or may be learned by the practice of the invention.

The present invention provides a system and method for extending the useful life of anti-collision lights included on commercial, military, and business jet aircraft. Such anti-collision lights generally include a xenon flash tube which periodically emits a brief, intense burst of light to attract the attention of pilots of other aircraft.

In some circumstances, such as when flying in high altitude tightly controlled airspace where instrument flight rules are controlling, the anti-collision lights need not operate at full power and intensity. For example, when an aircraft is cruising level at altitudes above 18,000 feet, the intensity of its anti-collision lights can be reduced without increasing the risk of collision. Thus, the power input to the anti-collision light can be slightly reduced resulting in greatly extending the life of the xenon flash tube.

Embodiments of the present invention include a means for sensing when the aircraft is above a threshold altitude. The threshold altitude is preferably in the range from about 18,000 to about 20,000 feet. Also included in embodiments of the present invention is a means for sensing when the aircraft undergoes a substantial change in altitude. For example, a rate of altitude change at least as great as about 100 feet per minute is considered a substantial change in altitude While normal deviations and drifts in altitude during a flight are not considered substantial.

A means for automatically reducing the power input to the anti-collision light is provided and is activated whenever the aircraft is above the threshold altitude and when the aircraft is not substantially changing altitude. By reducing the power input to the flash tube the useful life of the anti-collision light is extended.

Embodiments of the present invention can be adapted as a retrofit for existing anti-collision lights or can be included in newly manufactured anti-collision lights. In the embodiments of the present invention a control circuit generally provides the sensing and control functions and a power limiting circuit carries out the function of reducing the power applied to the flash tube to less than the maximum which the anti-collision light is capable of delivering. In this way, the useful life of the flash tube is extended while the intensity of the anti-collision light is reduced only slightly when full intensity is not required.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
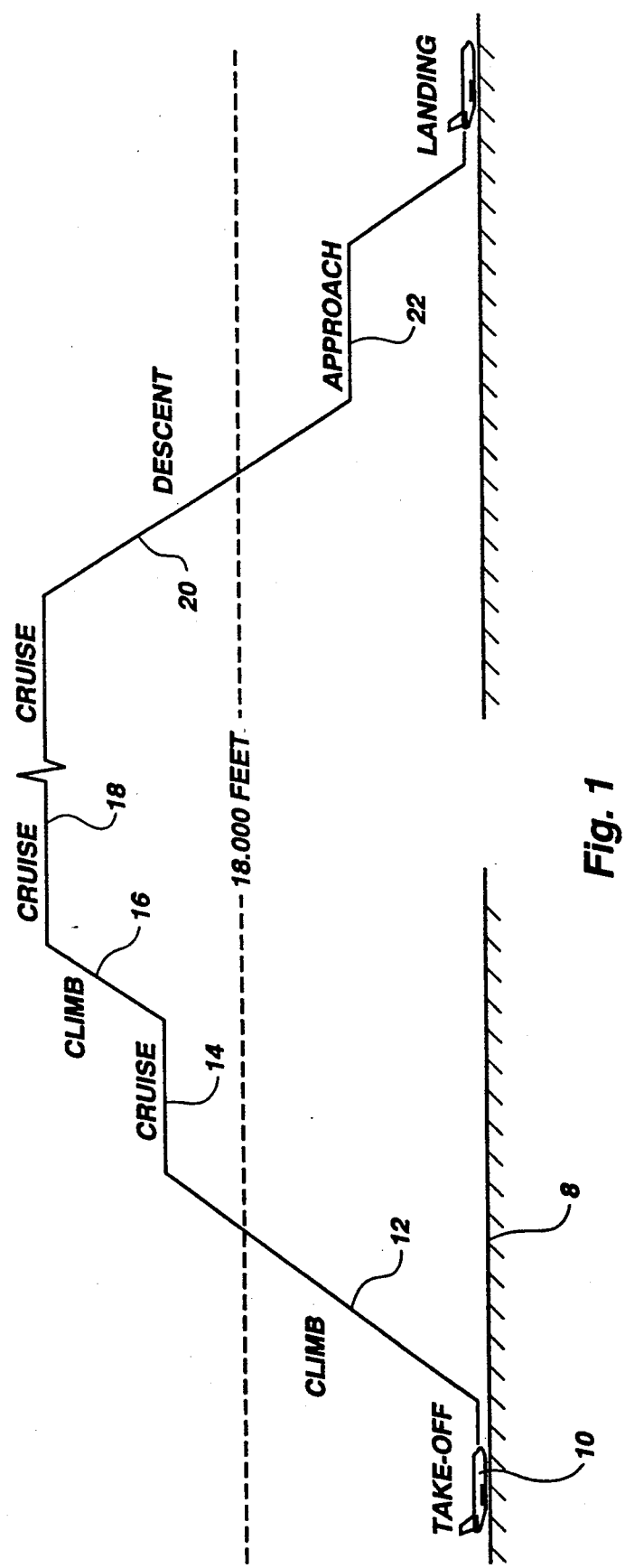
FIG. 1 is a diagram showing a typical flight profile for a commercial airliner and indicating the relative intensity of an anti-collision light equipped with the present invention.

Reference will now be made to the drawings wherein like structures will be provided with like reference designations.

As mentioned, the replacement of xenon flash tubes used in anti-collision lights on jet aircraft is a significant expense in the industry. Commercial, business, and military aircraft which are capable of IFR (Instrument Flight Rules) cruising at altitudes above 20,000 feet generally include two, three, or more than four anti-collision lights (tail and both wing tips) whose bright flashes attract the attention of pilots of other aircraft from miles around under appropriate condition when operating under Visual Flight Rules (VFR). Thus, when operating in crowded, uncontrolled airspace, the highly visible anti-collision strobe light is a great help to avoiding mid-air collisions.

As used herein, the term "anti-collision light" refers to those illumination devices mounted on an aircraft to make the aircraft more noticeable to the pilots of other nearby aircraft so that collisions therebetween are avoided. In some cases, those skilled in the art will refer to the illumination devices mounted on the upper and lower side of the aircraft fuselage as "anti-collision lights" and to the illumination devices mounted on the aircraft wing tips and tail as "auxiliary lights." Generally, the devices mounted on the upper and lower sides of the fuselage have an output of between 400 and 600 candela with much of the low candela output due to a red lens fitted over the flash tube. In contrast, the wing tip and tail mounted devices generally will have an output of between 2500 and 4000 candela when the flash tube is new. The wing tip and tail mounted devices, understandably, are those generally most noticeable by pilots of other aircraft. Thus, all of these illumination devices, regardless of their position on the aircraft, can be properly referred to as anti-collision lights.

Significantly, virtually all aircraft collisions and near misses occur near the ground and close to airports. It is revealing to note the number of collisions which occur on the ground at an airport. The zone of air extending from the ground up to 18,000 feet is officially known as uncontrolled air space. In this uncontrolled airspace, the vision of aircraft pilots is intended to be the primary collision avoidance system. Exceptions to this rule occur near major airports which are designated as controlled airspace but pilots are still very wary of the potential of mid-air collisions in this supposedly controlled airspace due to mistakes made by air traffic controllers and the pilots themselves.

In contrast, altitudes above 18,000 feet are designated as controlled airspace and are under the jurisdiction of air traffic controllers. This high altitude controlled airspace is strictly managed by air traffic controllers. Also, instrument flight rules are always in force above 18,000 feet and such airspace includes designated unidirectional air lanes. Thus, only appropriately equipped aircraft such as jet powered commercial, business, or military aircraft use this airspace.

It is well appreciated that the chance of a collision with other aircraft in this controlled airspace is less likely than in uncontrolled airspace under 18,000 feet where pilots must rely on visual observation for collision avoidance. While there have been efforts in the art to provide xenon flash tubes which are able to operate at full power for longer periods of time without requiring maintenance, i.e., replacement, it is still orthodox wisdom in the art that anti-collision lights must operate continuously during a flight, even when cruising in high altitude controlled airspace. Moreover, even though the need to regularly replace flash tubes has been long present, yet it has been unrecognized as a problem in the art, or if the problem has been recognized by someone in the art, there has been no suitable solutions yet proposed in the art.

Referring now to FIG. 1, an overview of the present invention is provided. FIG. 1 provides a diagram showing a typical flight profile for a commercial airliner. Represented in FIG. 1 is an aircraft 10 on the ground 8 ready for takeoff. In FIG. 1, full power, full intensity operation of the anti-collision lights is indicated by the thicker flight profile line; reduced power operation is indicated by the thinner flight profile line.

After takeoff, the aircraft 10 will typically start a climb 12 to a first cruise level 14 somewhere above 18,000 feet. Once the aircraft 10 has reached its first cruise level 14, in accordance with the present invention, the intensity of the anti-collision lights is reduced to a lower level as represented by the thinner line 14.

It will be appreciated that once the aircraft 10 has reached controlled airspace above 18,000 feet, and is not substantially changing altitude, the chances of a collision are greatly reduced and the need for anti-collision lights is commensurately greatly reduced. During a flight, an aircraft 10 will go from one cruise level 14, engage in a climb 16, and reach another cruise level 18. Thus, also in accordance with the present invention, during any substantial change in altitude, such as the climb 16, the intensity of the anti-collision light is restored to full power until the new cruise level has been reached.

Upon nearing its destination, the aircraft 10 begins its descent 20 and, in accordance with the present invention, the anti-collision lights resume full power operation through the aircraft's approach and landing. Importantly, the present invention reduces the intensity of the anti-collision light only when the aircraft 10 is above some threshold altitude, e.g., 18,000 feet, which corresponds substantially to the altitude at which controlled airspace begins preferably with a margin of 2,000 feet (i.e., 20,000 feet) and the aircraft is flying substantially level.

When the aircraft 10 undergoes any substantial change in altitude or is flying in uncontrolled airspace, the present invention resumes full intensity operation of the anti-collision lights. Preferably, a rate of change in altitude at least as great as about 100 feet per minute, and most preferably a rate of change in altitude at least as great as about 200 feet per minute, is considered a substantial change in altitude. Generally, a substantial change in altitude is that which is purposely initiated and not altitude drift which is normally encountered while cruising at a high altitude.

Using the present invention to reduce the intensity of the anti-collision lights by only ten to forty percent, the operating life of the xenon flash tube, or other light producing device, component of the anti-collision lights can be greatly increased.

It will be appreciated that extending the useful life of a xenon flash tube results in great savings to the operator of the aircraft. For example, if an embodiment of the present invention reduces the light output by merely about thirty percent, the useful life of the flash tube increases by a factor of fourteen. Generally, the relationship between the useful life of a xenon, for example, flash tube and the power input to the flash tube is to the 8.5 power. Generally, by reducing the light output from the flash tube by twenty percent, the useful life of the flash tube will be increased by at least an order of magnitude. Significantly, when the embodiments of the present invention reduce the input power to the flash tube, for example when the aircraft is cruising level and above 18,000 feet, the intensity of the light output from the flash tube is only slightly reduced and the useful life of the flash tube is greatly increased.

The reduction in power applied to the flash tube, and subsequent restoration to full power, is carried out automatically by the embodiments of the present invention without any attention from the pilot or crew of the aircraft. Moreover, the embodiments of the present invention are arranged so that if a failure occurs the anti-collision lights will return to full power, full intensity operation.

It will be appreciated that the present invention may be carried out in numerous ways. Preferred embodiments of the present invention are described herein with the understanding that the invention may be carried out using arrangements which are presently available to those skilled in the art using the teachings contained herein or using arrangements which will become available in the future.

Figure 2:
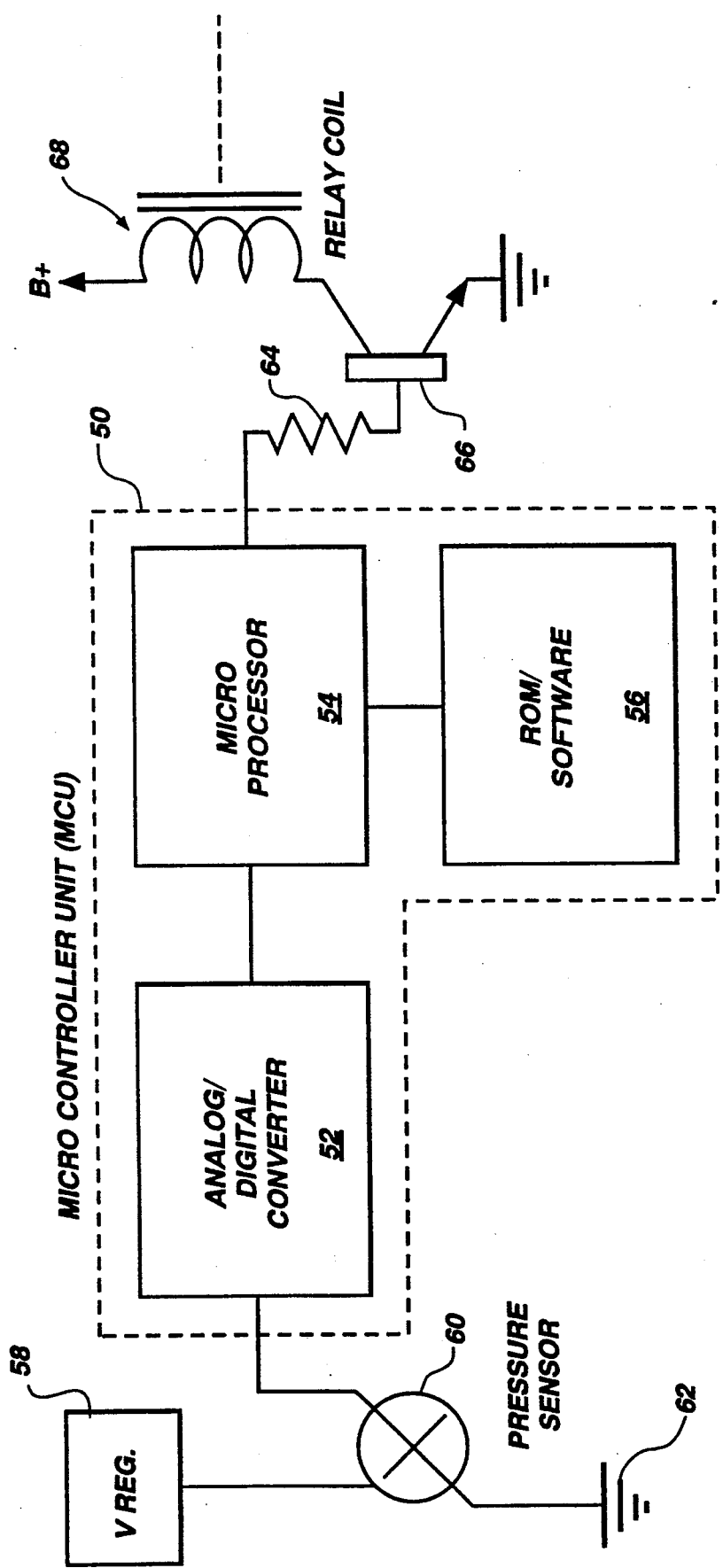
FIG. 2 is a block diagram depicting a first, digital-based, presently preferred embodiment of a control circuit for carrying out the present invention.

Referring next to FIG. 2, a block diagram depicting a first, digital based, preferred embodiment of a control circuit is provided. The control circuit depicted in FIG. 2 interfaces with a relay (the relay coil is generally represented at 68), or other control device, which functions with other components (to be described shortly) to reduce the power input to the flash tube.

Represented in FIG. 2 is a pressure sensor device 60. Preferably, the pressure sensor device is one of pressure sensors available from Motorola included in the MPX5100 series of products although other sensors can also be used within the scope of the present invention. Desirably, the specified sensor is an "absolute" pressure sensor with internal amplification and temperature compensation. The specified pressure sensor 60 has an output of 0.5 to 4.5 volts (typically 1.2 to 4.5 volts over our pressure range of interest) which is well suited to drive the analog to digital converter (A/D) 52 included in the microcontroller unit 50. If the specified pressure sensor 60 is utilized, a voltage regulator 58 is preferably included to supply a regulated voltage to the pressure sensor 60 which is also connected to ground 62.

It will be understood that the primary function of illustrated control circuits is to determine when the aircraft is above a threshold altitude, i.e., the aircraft is in controlled airspace, and determine when the rate of change in altitude is less than a predetermined value, i.e., the aircraft is flying level. Thus, those skilled in the art will appreciate that other arrangements can be configured within the scope of the present invention to perform these functions.

The voltage output from the pressure sensor 60 (representing the altitude of the aircraft) is digitized by the analog to digital converter 52 (converted from a time varying signal into a binary code) and conveyed to a microprocessor 54. A read only memory (ROM) contains programming code for the microprocessor 54 as can be devised by one skilled in the art using the teachings contained herein. The programming code carries out steps such as: periodically read the pressure sensor; calculate an averaged pressure sensor reading to reduce the effect of any unwanted noise; and compare the averaged signal with a predetermined reference value (stored in memory) to determine if the aircraft is above a minimum altitude (e.g., above 20,000 feet). It is also preferred to compare a present reading with other recent readings to see if any change in altitude exceeds a predetermined rate corresponding to a substantial change in altitude.

Those skilled in the art will understand that additional steps can desirably be carried out by the microprocessor 54. Such steps can include self-checking of various internal functions and, possibly, monitor the anti-collision light's actual candela output. Self-checking of the actual luminous output of the anti-collision light can function as an important interim test between more complete checks carried out on the ground. If a fault is detected during a self checking routine, a signal can alert maintenance personnel during routine ground checks. Importantly, if one of the described embodiments of the invention fails, it fails so that the anti-collision light remains at full intensity until the fault is corrected.

The microprocessor 54 outputs a control signal to a drive transistor 66, or some other electrical switching device, via base resistor 64. The drive transistor 66 operates a relay coil 68 which in turn switches in the device(s) (not represented in FIG. 2) which lower the power input to the flash tube.

Figure 3:
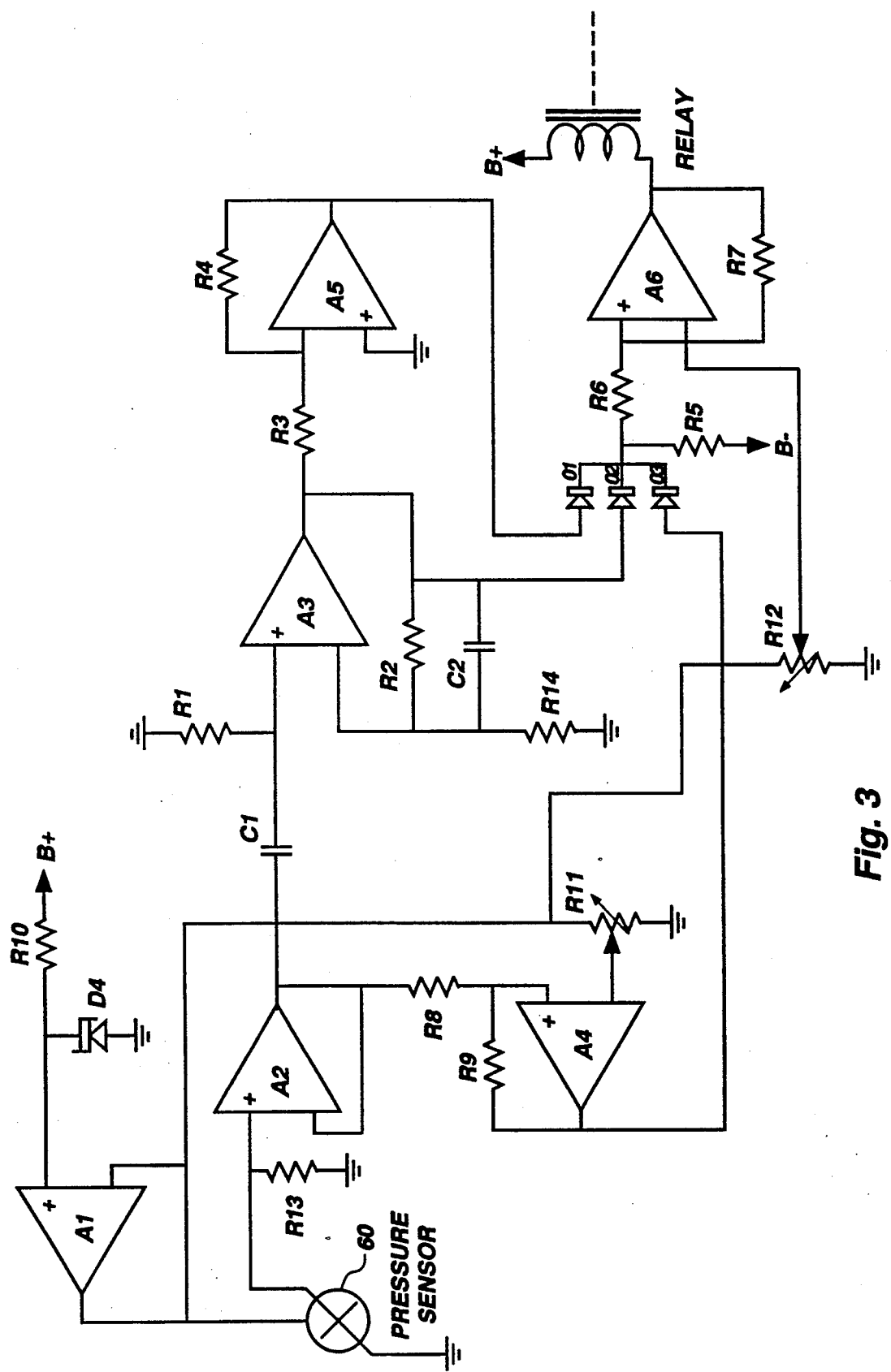
FIG. 3 is a schematic diagram depicting a second, analog-based, presently preferred embodiment of a control circuit for carrying out the present invention.

Referring next to FIG. 3, a schematic diagram of a second, analog-based, presently preferred control circuit for use in carrying out the present invention is provided. Many of the reference designations generally included in such schematic diagrams have been included in FIG. 3 in order to maintain the clarity of the description of this arrangement of the control circuit.

Represented in FIG. 3 are a plurality of integrated circuit amplifiers designated as A1-A6. These amplifiers can be those which are available in the art. A power source amplifier A1 is used to provide a temperature compensated power source and increase line isolation for the pressure sensor 60. The pressure sensor 60 used with the control circuit illustrated in FIG. 3 can preferably be the same as the one previously described or selected in accordance with the same criteria.

A temperature compensation reference diode D4 is selected which will have good temperature characteristics for the range of temperatures expected when installed in the aircraft in order to keep the voltage supplied to the pressure sensor 60 constant. It will be appreciated that if the control circuit is located at the anti-collision light, the temperatures may vary from well below −60° F. to above +130° F. and the voltage supplied by the power supply amplifier A1 must be stable over this range. Alternatively, the control circuit can be located in the electrical and electronics compartment of the aircraft. In the temperature controlled and pressurized electrical and electronics compartment of the aircraft it is less important to provide a power supply amplifier A1 which is stable over a broad range of temperatures.

The power supply amplifier A1 also supplies a stable voltage to resistor R11. Resistor R11 functions as an absolute altitude reference potentiometer. The resistor R12 functions as a settling time adjustment potentiometer.

The output of the pressure sensor 60 is fed to a buffer amplifier A2 and functions to provide isolation from the loading effects of subsequent circuits, namely, a rate detector A3 and an altitude comparitor A4. The buffer amplifier A2 has a voltage gain of unity but functions to provide both power gain and isolation for the pressure sensor 60. Thus, the output of the buffer amplifier A2 provides unity voltage gain but is able to source sufficient current to drive subsequent components.

The rate detector A3 receives the signal output from the buffer amplifier A2 which has been integrated by the time constant provided by capacitor C1 and resistor R1. The time constant provided by the capacitor C1 and the resistor R1, and the values of feedback resistor R2 and capacitor C2 and resistor R14, cause the bandwidth of the rate detector A3 to be very limited. This desirably gives stable operation within the frequencies or rates expected to be encountered. Resistors R2 and R14 set the voltage gain of rate detector A3 to 1000:1 at zero Hz while capacitor C2 provides heavy feedback for any AC component effectively reducing the gain of comparator A3 to a very low value for higher frequency signals (i.e., voltage gain is reduced to 1:2 at 1000 Hz). The values of C1 and R1 are carefully selected to provide precise sensitivity to altitude changes of 200 feet per minute or greater. The values of these components can be readily altered to provide sensitivity to changes of 300 or 100 feet per minute. The rate detector A3 should be arranged so that substantial changes in altitude and not normal altitude drift are detected.

Still referring to FIG. 3, when the altitude of the aircraft is increasing the signal provided by the pressure sensor 60 is negative going, therefore the output of rate detector A3 is also negative going. The negative going output of rate detector A3 has no effect on a driver circuit A6 due to the blocking function of diode D2. Diode D2 is one of three diodes (D1, D2, and D3) which form a positive OR logic gate.

Those skilled in the pertinent art will understand that a positive OR gate is the logical equivalent of a negative AND (NAND) logic gate. Thus, diodes D2 and D3, while appearing as a positive OR gate, is functioning as a NAND logic gate. In this way, anytime a high level signal is input to any of the three diodes (D1, D2, or D3), the intensity of the anti-collision light will be maintained at full output.

The output of rate detector A3 is also coupled to an invertor A5 through input resistor R3. Invertor A5 reproduces the signal input to it from the rate detector A3 but of the opposite polarity (and of equal amplitude, i.e., R3=R5). Thus, when the output of the rate detector A3 is going negative, the output of the invertor A5 will be going positive and vice-a-versa. Since the outputs of both the rate detector A3 and the invertor A5 are coupled through diodes D2 and D1, respectively, to the driver A6, any substantial change in altitude (either ascending or descending) will cause the output of driver A6 to go or remain high. No change or an insubstantial change in altitude causes the outputs of the rate detector A3 and the invertor A5 to stay at, or near, zero. Resistors R7 and R6 provide some stabilizing feedback to the driver A6.

The output of the buffer amplifier A2 also is directed to a comparator A4. The one input of the comparator A4 receives a reference voltage which is set by resistor R11 to correspond to an altitude of 20,000 feet. Thus, when the aircraft is at altitudes below 20,000 feet, the signal output from the pressure sensor 60 is more positive than the reference voltage provided by the resistor R11, thereby causing the output of the comparator A4 to go high. Resistors R8 and R9 provide a small amount of positive feedback to cause the comparator A4 to act like a Schmitt trigger. The output of comparator A4 is coupled through diode D3 to the driver A6. When the output of the driver A6 goes low, the contacts of a power relay RL1 are placed in their normally open position and the anti-collision light will operate at reduced intensity whenever the altitude is above the setting of resistor R11, the absolute altitude adjustment.

The inclusion of the negative AND logic (positive OR logic) gate formed by the diodes D1, D2 and D3, provide that if all three conditions occur, the power control relay will be activated and reduced power will be input to the flash tube. Negative inputs to all diodes D1, D2, and D3 causes the output of driver A6 to go negative which energizes the relay RL1 causing the anti-collision light intensity to be reduced. In the described control circuits, this is the appropriate condition whenever the aircraft is above 20,000 feet. Regardless of absolute altitude, when the aircraft is substantially ascending or descending, the anti-collision light remains at full intensity.

It will be appreciated that the described control circuits are merely the presently preferred examples of a means for sensing when the aircraft is above a threshold altitude and a means for sensing when the aircraft undergoes a substantial change in altitude. Many other arrangements, both those which can be presently devised by those skilled in the art and those using devices which will become available in the future, can carry out functions the same as, or equivalent to, those carried out by the control circuits described herein.

Provided below in Table A is a list of the preferred values for the components represented in FIG. 3.

TABLE A

| Reference Designation | Component |
| --- | --- |
| A1-A6 | Amplifiers - integrated circuit(s) |
| D1, D2, D3 | Diodes (used to form NAND gate) |
| PRESSURE SENSOR | Motorola Series MPX5100 |
| D4 | Diode, zener, temperature stable |
| R1 | 680K |
| R2 | 1M |
| R3 | 10K |
| R4 | 10K |
| R5 | 7.5K |
| R6 | 680 |
| R7 | 15K |
| R8 | 470 |
| R9 | 200K |
| R10 | 5.2K |
| R11 | Potentiometer 10K |
| R12 | Potentiometer 10K |
| C1 | 1.5 µF |
| C2 | 1.5 µF |
| RL1 | Normally closed relay |

As indicated previously, each aircraft can be provided with anywhere from two to more than five anti-collision lights. In some circumstances, it can be most desirable to include a control circuit, such as one of those just described, at the location of each anti-collision light. Alternatively, as will be described shortly, nearly all of the components embodying the present invention can be positioned at a central location in the aircraft, i.e., the electrical and electronics compartment.

Moreover, it will be appreciated that there are a large number of aircraft in service having a variety of existing anti-collision lights in use thereon. Such anti-collision lights might be mounted on the fuselage, tail, or the wings of an aircraft. Thus, the embodiments of the present invention can be readily adapted to be configured as a retrofit on a variety of anti-collision lights from various manufacturers or as part of a newly manufactured and installed anti-collision light.

Independent of whether an embodiment of the present invention is intended to be used as a retrofit for an existing anti-collision light or as part of a newly manufactured anti-collision light, the before described, or other, arrangements for a control circuit can be used. Moreover, the components which carry out the function of limiting power to the flash tube can take a variety of arrangements. Some arrangements of the power limiting circuit are best suited to function as a retrofit for one or another existing anti-collision light. Some arrangements of the power limiting circuits are best suited for use in newly manufactured anti-collision lights. Provided below are examples of power limiting arrangements which have application for implementing the present invention in a variety of circumstances.

Figure 4:
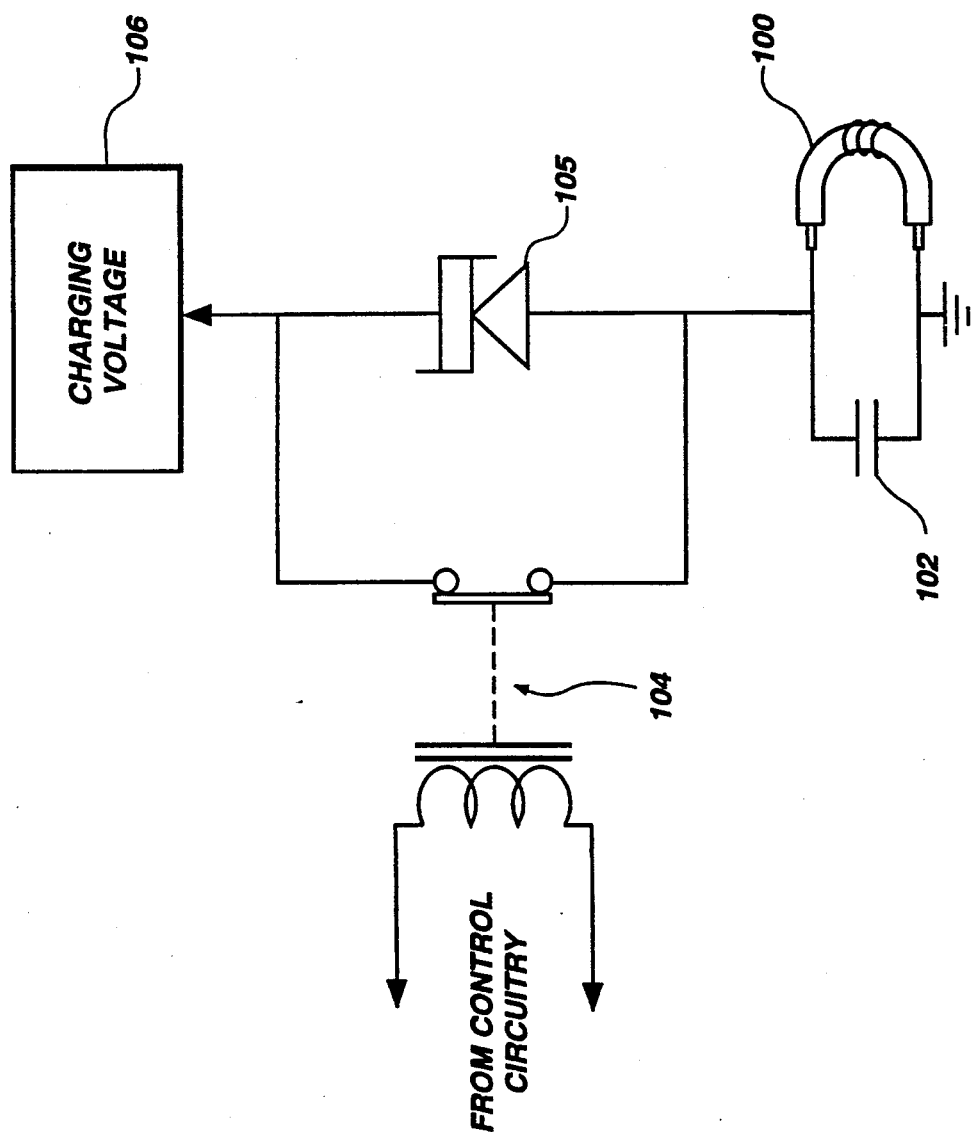
FIG. 4 is a diagram representing a first preferred arrangement used to reduce the power applied to a flash tube of an anti-collision light.

Referring next to FIG. 4, a general schematic of a first power limiting circuit is provided. The power limiting circuits, in one way or another, reduce the power input to the anti-collision light flash tube and can be used with the control circuits represented in either FIG. 2 or FIG. 3.

Figure 5:
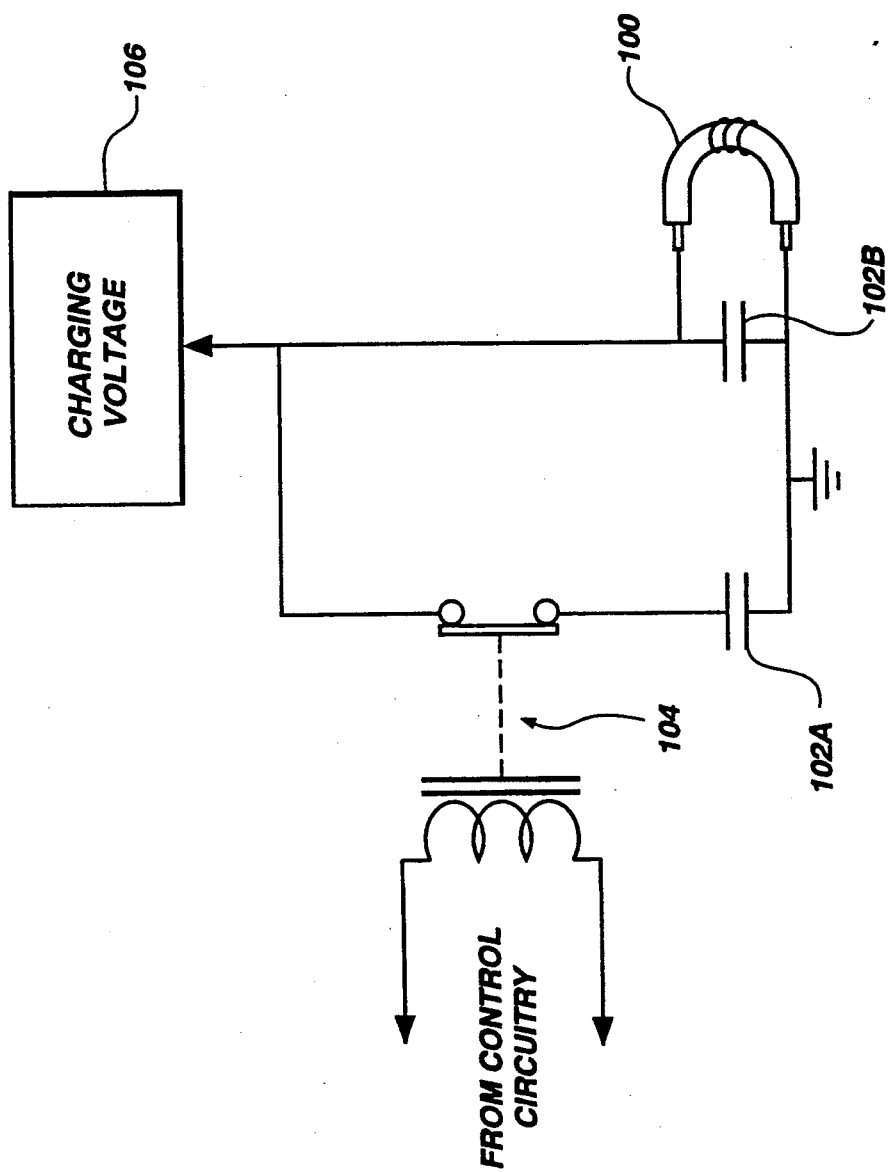
FIG. 5 is a diagram representing a second preferred arrangement used to reduce the power applied to a flash tube of an anti-collision light.
Figure 6:
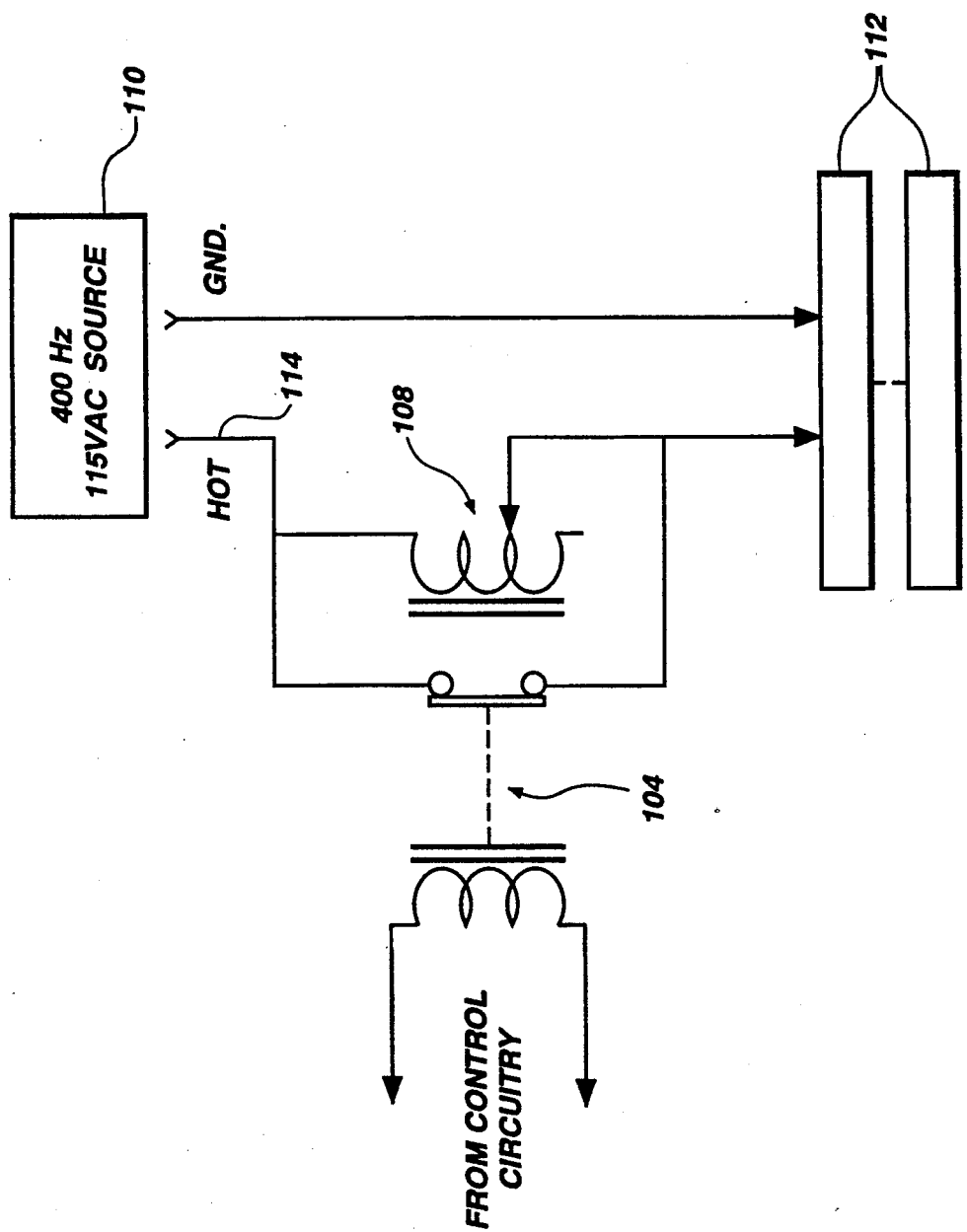
FIG. 6 is a diagram representing a third preferred arrangement used to reduce the power applied to a flash tube of an anti-collision light.

In FIG. 4, a flash tube 100 and a discharge capacitor 102 are represented. As is well-known in the art, the general principal of operation of a flash tube is to charge a capacitor to a relatively high voltage and then discharge the current stored in the capacitor into the flash tube causing a burst of light whose brightness is proportional to the power input to the flash tube. Those skilled in the art will appreciate that the diagrams provided in FIGS. 4–6 are simplified to better illustrate the principles of the present invention and that additional components are needed, as are known in the art, to provide a operational anti-collision light.

The arrangement represented in FIG. 4 reduces the power input to the flash tube 100 by reducing the voltage on the capacitor. In the arrangement illustrated in FIG. 4, a zener diode 105 is connected in parallel with the normally closed contacts of a relay 104. The coil 66 of the relay 104 is represented in FIGS. 2–3. When the contacts of the relay 104 are closed (their normal position) the full value of the charging voltage is impressed upon the discharge capacitor 102.

When the contacts of the relay 104 are open, a power zener diode 105 is placed in series with the charging voltage 106 and the discharge capacitor 102. When the power zener diode is placed in series with the charging voltage 106 and the discharge capacitor, the voltage impressed upon the discharge capacitor is reduced by the voltage drop across the power zener diode 105. The value of the power zener diode 105 is preferably chosen to reduce the input voltage by about 20% with other values being usable in accordance with the particular desired results and circumstances.

The arrangement illustrated in FIG. 4 is well suited to retrofit an existing anti-collision light with the present invention. It will be understood that in the case of a newly designed and manufactured anti-collision light, it would be preferable to implement the power limiting function using, for example, a series power transistor that limits the power to the discharge capacitor and/or the flash tube. Many other alternatives are also available and can be devised by those skilled in the art using the teachings contained herein. It is preferred that the voltage present across the capacitor be controlled, rather than controlling the current passing through the flash tube, so that low current components can be used.

Referring next to FIG. 5, a general schematic of a second power limiting circuit is provided. The arrangement represented in FIG. 5 operates by blocking the power which would be delivered by one or more of a plurality of capacitors 102A-B included in an anti-collision light. In most existing anti-collision lights, a plurality of capacitors will be connected in parallel in order to arrive at the desired value of capacitance. Removing one or more of the capacitors 102A from the parallel circuit by opening the normally closed contacts of the relay 104 reduces the power input to the flash tube 100. This arrangement has the disadvantage of requiring the relay 104 contacts to handle the high current flow which may lead to the early failure of the relay or other switching device unless consideration is made for this difficulty.

Reference will next be made to FIG. 6. With the arrangement represented in FIG. 6, a control circuit, such as one which has been previously described, is used. In contrast with the power limiting circuits represented in FIGS. 4–5, the power limiting circuit represented in FIG. 6 is intended to be positioned at a central location on the aircraft and also be connected to the power line, or lines, connecting the plurality of anti-collision lights 112 to a 115 volts AC 400 Hz source 110.

Significantly, it is generally true that existing, installed anti-collision lights using xenon flash tubes are not provided with any internal voltage regulation. Therefore, by merely reducing the line voltage presented to all of the anti-collision lights, the useful life of the flash tubes will be extended. Thus, by reducing the line voltage to all of the anti-collision lights by ten percent, the light output will be reduced approximately 30 percent and the useful life of the flash tube will be increased by a factor of about fourteen times. Additionally, reducing the input line voltage this small amount does not adversely affect the operation of the anti-collision lights. Moreover, since the one second flash rate of the anti-collision light is determined by dividing down the 400 Hz line frequency, the flash rate remains stable even when the line voltage is reduced.

Referring to FIG. 6, a tapped inductor 108 is shown connected in parallel with the normally closed contacts of the relay 104. When the relay 104 contacts are closed, the tapped inductor 108 is bypassed. By varying the tap point on the tapped inductor 108, differing values of loading can be accommodated so that the voltage drop placed in the hot conductor is adjusted to some fixed value, for example, 10 percent. This adjustment allows the voltage drop to be kept constant even when the number of anti-collision lights being fed by the hot conductor 114 varies from aircraft to aircraft.

Importantly, it is within the scope of the present invention to reduce the power input to the flash tube in other ways. Also, the value of the voltage or current which is blocked from the flash tube may be varied to values other than those explicitly stated herein.

The power limiting circuits described herein are the presently preferred examples of a means for automatically reducing the power input to the anti-collision light. Importantly, many other arrangements, both those presently available to those skilled in the art and those which can be devised in the future, can carry out functions similar or equivalent to the presently preferred examples for carrying out a means for reducing the power input to the flash tube of the anti-collision light. For example, it is within the scope of the present invention to utilize an existing altitude determining device, such as an altimeter, an internal guidance system, or a Global Position System (GPS) device, as part of a control circuit.

In view of the forgoing, it will be appreciated that the present invention provides a system and method for extending the useful life of aircraft anti-collision lights which does not impair the intended function of the anti-collision lights and which can be used with anti-collision lights positioned anywhere on an aircraft. Also, the present invention provides a system and method for extending the useful life of aircraft anti-collision lights which is reliable and which can be effectively retrofitted to existing anti-collision lights. Furthermore, the present invention provides a system and method for extending the useful life of aircraft anti-collision lights which is of low enough cost so that the cost of the system is earned back in saved maintenance costs in a relatively short time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for extending the useful life of an anti-collision light included on an aircraft capable of flying in high altitude controlled air space, the apparatus comprising:
   means for sensing when the aircraft is above a threshold altitude;
   means for sensing when the aircraft undergoes a substantial change in altitude; and
   means for automatically reducing power input to the anti-collision light when the aircraft is above the threshold altitude and when the aircraft is not substantially changing altitude such that the useful life of the anti-collision light is extended.

2. An apparatus for extending the useful life of an anti-collision light included on an aircraft as defined in claim 1 wherein the anti-collision light comprises a xenon flash tube.

3. An apparatus for extending the useful life of an anti-collision light included on an aircraft as defined in claim 2 wherein the anti-collision light further comprises at least one discharge capacitor.

4. An apparatus for extending the useful life of an anti-collision light included on an aircraft as defined in claim 1 wherein the threshold altitude is substantially the minimum altitude of controlled air space.

5. An apparatus for extending the useful life of an anti-collision light included on an aircraft as defined in claim 1 wherein the means for sensing when the aircraft is above a threshold altitude comprises a global positioning system device.

6. An apparatus for extending the useful life of an anti-collision light included on an aircraft as defined in claim 1 wherein the means for sensing when the aircraft is above a threshold altitude comprises an inertial guidance system.

7. An apparatus for extending the useful life of an anti-collision light included on an aircraft as defined in claim 1 wherein the means for automatically reducing power comprises means for reducing the voltage input to the anti-collision light.

8. An apparatus for extending the useful life of an anti-collision light included on an aircraft as defined in claim 1 wherein the means for sensing when the aircraft is above a threshold altitude comprises means for sensing the absolute ambient pressure around the aircraft.

9. An apparatus for extending the useful life of an anti-collision light included on an aircraft as defined in claim 8 wherein the means for sensing when the aircraft is above a threshold altitude comprises means for sensing when the aircraft is above 18,000 feet.

10. An apparatus for extending the useful life of an anti-collision light included on an aircraft as defined in claim 8 wherein the means for sensing when the aircraft is above a threshold altitude comprises means for sensing when the aircraft is above 20,000 feet.

11. An apparatus for extending the useful life of an anti-collision light included on an aircraft as defined in claim 1 wherein the anti-collision light comprises a charging voltage supply and a plurality of discharge capacitors and wherein the means for automatically reducing the power input to the anti-collision light comprises means for inserting a voltage drop between the charging voltage supply and at least one of the discharge capacitors.

12. An apparatus for extending the useful life of an anti-collision light included on an aircraft as defined in claim 1 wherein the anti-collision light comprises a charging voltage supply and a plurality of discharge capacitors and wherein the means for automatically reducing the power input to the anti-collision light comprises means disconnecting at least one of the discharge capacitors from the charging voltage supply.

13. An apparatus for extending the useful life of an anti-collision light included on an aircraft as defined in claim 1 wherein the means for sensing when the aircraft undergoes a substantial change in altitude comprises means for sensing when the aircraft undergoes a change in altitude at a rate at least as greater as 100 feet per minute.

14. An apparatus for extending the useful life of an anti-collision light included on an aircraft as defined in claim 1 wherein the means for sensing when the aircraft undergoes a substantial change in altitude comprises means for sensing when the aircraft undergoes a change in altitude at a rate at least as great as 200 feet per minute.

15. An apparatus for extending the useful life of an anti-collision light included on an aircraft as defined in claim 1 wherein the means for sensing when the aircraft is above a threshold altitude comprises a pressure sensor and a microprocessor.

16. A system for lengthening the useful life of a flash tube containing an inert gas and mounted in an anti-collision light included on an aircraft capable of flying in high altitude controlled air space, the anti-collision light comprising a charging voltage source and at least one capacitor device, the system comprising:
  a pressure sensor configured to sense the absolute ambient pressure about the aircraft, the pressure sensor outputting a pressure signal;
  means for determining when the pressure signal reaches a value which corresponds to a sensed pressure substantially equivalent to an altitude of at least 18,000 feet;
  means for determining when the pressure signal changes at a rate at least as great as that corresponding to a rate of altitude change of 100 feet per minute; and
  means for reducing the power input to the flash tube whenever the pressure signal corresponds to an altitude at least as great as 18,000 feet and when the pressure signal is not changing at a rate at least as great as that corresponding to a rate of altitude change of 100 feet per minute such that the output of the flash tube is decreased and the useful life of the flash tube is increased and for increasing the power input to the flash tube to full power whenever the pressure signal corresponds to an altitude less than about 18,000 feet or when the pressure signal changes at a rate at least as great as that corresponding to a rate of altitude change of 100 feet per minute.

17. A system for lengthening the useful life of a flash tube containing an inert gas and mounted in an anti-collision light included on an aircraft as defined in claim 16 wherein the inert gas comprises xenon.

18. A system for lengthening the useful life of a flash tube containing an inert gas and mounted in an anti-collision light included on an aircraft as defined in claim 16 wherein the aircraft comprises a jet powered aircraft.

19. A system for lengthening the useful life of a flash tube containing an inert gas and mounted in an anti-collision light included on an aircraft as defined in claim 16 wherein the aircraft comprises an anti-collision light positioned on its tail and an anti-collision light positioned on each of its wings and wherein the means for reducing the power input to the flash tubes positioned on the tail and the wings of the aircraft comprises means for reducing the voltage delivered to the anti-collision lights, the means for reducing the voltage being positioned remote from the anti-collision lights.

20. A system for lengthening the useful life of a flash tube containing an inert gas and mounted in an anti-collision light included on an aircraft as defined in claim 19 wherein the means for reducing the voltage comprises a tapped inductor.

21. A system for lengthening the useful life of a flash tube containing an inert gas and mounted in an anti-collision light included on an aircraft as defined in claim 16 wherein the means for reducing the power input to the flash tube comprises means for inserting a voltage drop between the charging voltage supply and at least one of the discharge capacitors.

22. A system for lengthening the useful life of a flash tube containing an inert gas and mounted in an anti-collision light included on an aircraft as defined in claim 16 wherein the means for reducing the power input to the flash tube comprises means for disconnecting at least one of the capacitor devices from the charging voltage supply.

23. A system for lengthening the useful life of a flash tube containing an inert gas and mounted in an anti-collision light included on an aircraft as defined in claim 16 wherein the means for reducing the power input to the flash tube comprises a pressure sensor and a microprocessor.

24. A method of lengthening the useful life of a flash tube used in an anti-collision light included on an aircraft capable of flying in high altitude controlled air space, the method comprising the steps of:
  sensing when the aircraft is above a threshold altitude;
  sensing when the aircraft undergoes a substantial change in altitude; and
  reducing the power input to the flash tube when the aircraft is above the threshold altitude and when the aircraft is not substantially changing altitude such that the useful life of the flash tube is lengthened.

25. A method for lengthening the useful life of a flash tube contained in an anti-collision light included on an aircraft as defined in claim 24 wherein the step of sensing when the aircraft is above a threshold altitude comprises the step of sensing when the aircraft is above the minimum altitude of controlled air space.

26. A method of lengthening the useful life of a flash tube contained in an anti-collision light included on an aircraft as defined in claim 24 wherein the step of sensing when the aircraft is above a threshold altitude comprises the step of sensing when the aircraft is above the minimum altitude of controlled air space.

27. A method of lengthening the useful life of a flash tube contained in an anti-collision light included on an aircraft as defined in claim 24 wherein the aircraft comprises an anti-collision light positioned on its tail and an anti-collision light positioned on each of its wings and wherein the step of reducing the power input to the flash tube further comprises the step of reducing the voltage delivered to the anti-collision lights.

28. A method of lengthening the useful life of a flash tube contained in an anti-collision light included on an aircraft as defined in claim 24 wherein the step of sensing when the aircraft is above a threshold altitude comprises the step of sensing when the aircraft is above 18,000 feet.

29. A method of lengthening the useful life of a flash tube contained in an anti-collision light included on an aircraft as defined in claim 24 wherein the anti-collision light comprises at least one charging capacitor and a charging voltage supply, wherein the step of reducing the power input to the flash tube comprises the step of inserting a voltage drop device between the charging voltage supply and one of the discharge capacitors.

30. A method of lengthening the useful life of a flash tube contained in an anti-collision light included on an aircraft as defined in claim 24 wherein the anti-collision light comprises at least one charging capacitor and a charging voltage supply, wherein the step of reducing the power input to the flash tube comprises the step of disconnecting at least one of the discharge capacitors.

31. A method of lengthening the useful life of a flash tube contained in an anti-collision light included on an aircraft as defined in claim 24 wherein the step of sensing when the aircraft undergoes a substantial change in altitude comprises the step of sensing when the aircraft undergoes a change in altitude at a rate at least as great as 100 feet per minute.

32. An method of lengthening the useful life of a flash tube contained in an anti-collision light included on an aircraft as defined in claim 24 wherein the step of reducing the power input to the flash tube comprises the step of reducing the power input to the flash tube in the range from about 10% to about 30%.

* * * * *

UNITED STATES PATENT AND TRADEMARK OFFICE
CERTIFICATE OF CORRECTION

PATENT NO.  : 5,206,644
DATED       : April 27, 1993
INVENTOR(S) : Robert H. Dempsey It is certified that error appears in the above-identified patent and that said Letters Patent is hereby corrected as shown below:

On the Title page, item [76];
the middle initial "M." appearing in the inventor's name should be changed so that the inventor's name appears:

Robert -- H. -- Dempsey

Signed and Sealed this

Twenty-fifth Day of January, 1994

Attest:

BRUCE LEHMAN

*Attesting Officer*     *Commissioner of Patents and Trademarks*